United States Patent
Shin et al.

(10) Patent No.: US 10,523,460 B2
(45) Date of Patent: Dec. 31, 2019

(54) ELECTRONIC APPARATUS AND EXTERNAL APPARATUS CONTROLLING METHOD THEREOF

(71) Applicant: SAMSUNG ELECTRONICS CO., LTD., Suwon-si, Gyeonggi-do (KR)

(72) Inventors: Seung-min Shin, Seoul (KR); Je-youn Dong, Suwon-si (KR); Hae-rim Son, Seoul (KR); In-jee Song, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 299 days.

(21) Appl. No.: 15/456,922

(22) Filed: Mar. 13, 2017

(65) Prior Publication Data

US 2017/0295032 A1 Oct. 12, 2017

(30) Foreign Application Priority Data

Apr. 8, 2016 (KR) .................. 10-2016-0043447

(51) Int. Cl.
*G06F 15/16* (2006.01)
*H04L 12/28* (2006.01)
(Continued)

(52) U.S. Cl.
CPC ...... *H04L 12/2816* (2013.01); *H04L 12/2814* (2013.01); *H04L 63/10* (2013.01); *H04L 69/32* (2013.01)

(58) Field of Classification Search
CPC ... H04L 29/08072; H04L 29/06; H04L 69/32; H04L 63/10; G06F 16/954
(Continued)

(56) References Cited

U.S. PATENT DOCUMENTS 7,644,414 B2 * 1/2010 Smith .................. G06F 8/20
  709/201
8,670,604 B2 3/2014 Eggert et al.
(Continued)

FOREIGN PATENT DOCUMENTS

KR 10-1481536 1/2015
KR 10-2015-0136981 12/2015
(Continued)

OTHER PUBLICATIONS

Extended European Search Report dated May 9, 2017 in counterpart European Patent Application No. 17153981.0.

*Primary Examiner* — Khanh Q Dinh
(74) *Attorney, Agent, or Firm* — Nixon & Vanderhye P.C.

(57) ABSTRACT

An electronic apparatus is disclosed, the electronic apparatus including a communicator comprising communication circuitry configured to communicate with an external apparatus, a memory configured to store knowledge information including information regarding the external apparatus and a plurality of action templates that define an operation of the external apparatus and a controller configured to receive identification information of the external apparatus through the communication circuitry of the communicator, to acquire knowledge information and an action template corresponding to the external apparatus based on the identification information from the memory, to generate a command to operate the external apparatus based on the knowledge information and the action template and to transmit the command to the external apparatus through the communication circuitry of the communicator.

19 Claims, 8 Drawing Sheets

(51) Int. Cl.
*H04L 29/06* (2006.01)
*H04L 29/08* (2006.01)

(58) Field of Classification Search
USPC .................. 709/203, 220, 224, 226, 228
See application file for complete search history.

(56) References Cited

U.S. PATENT DOCUMENTS

| | | | | |
|---|---|---|---|---|
| 9,269,095 | B1* | 2/2016 | Chan | G06F 16/248 |
| 9,323,515 | B1* | 4/2016 | Daley | G06F 8/65 |
| 9,582,598 | B2* | 2/2017 | Kalgi | G06F 16/958 |
| 2005/0019739 | A1* | 1/2005 | Cunningham | G09B 7/02 |
| | | | | 434/350 |
| 2005/0108518 | A1* | 5/2005 | Pandya | H04L 63/0485 |
| | | | | 713/151 |
| 2012/0117610 | A1* | 5/2012 | Pandya | H04L 63/0485 |
| | | | | 726/1 |
| 2012/0265744 | A1* | 10/2012 | Berkowitz | G06Q 30/06 |
| | | | | 707/705 |
| 2012/0303618 | A1 | 11/2012 | Dutta et al. | |
| 2013/0246199 | A1* | 9/2013 | Carlson | G06Q 20/20 |
| | | | | 705/16 |
| 2013/0246261 | A1* | 9/2013 | Purves | G06Q 20/105 |
| | | | | 705/41 |
| 2014/0244001 | A1 | 8/2014 | Glickfield et al. | |
| 2015/0019342 | A1 | 1/2015 | Gupta | |
| 2015/0019710 | A1 | 1/2015 | Shaashua et al. | |
| 2015/0199610 | A1 | 7/2015 | Hershberg | |
| 2015/0220914 | A1* | 8/2015 | Purves | G06Q 20/36 |
| | | | | 705/26.8 |
| 2015/0281002 | A1 | 10/2015 | Xu et al. | |

FOREIGN PATENT DOCUMENTS

| | | |
|---|---|---|
| WO | 2005/050921 | 6/2005 |
| WO | 2014/092503 | 6/2014 |

\* cited by examiner

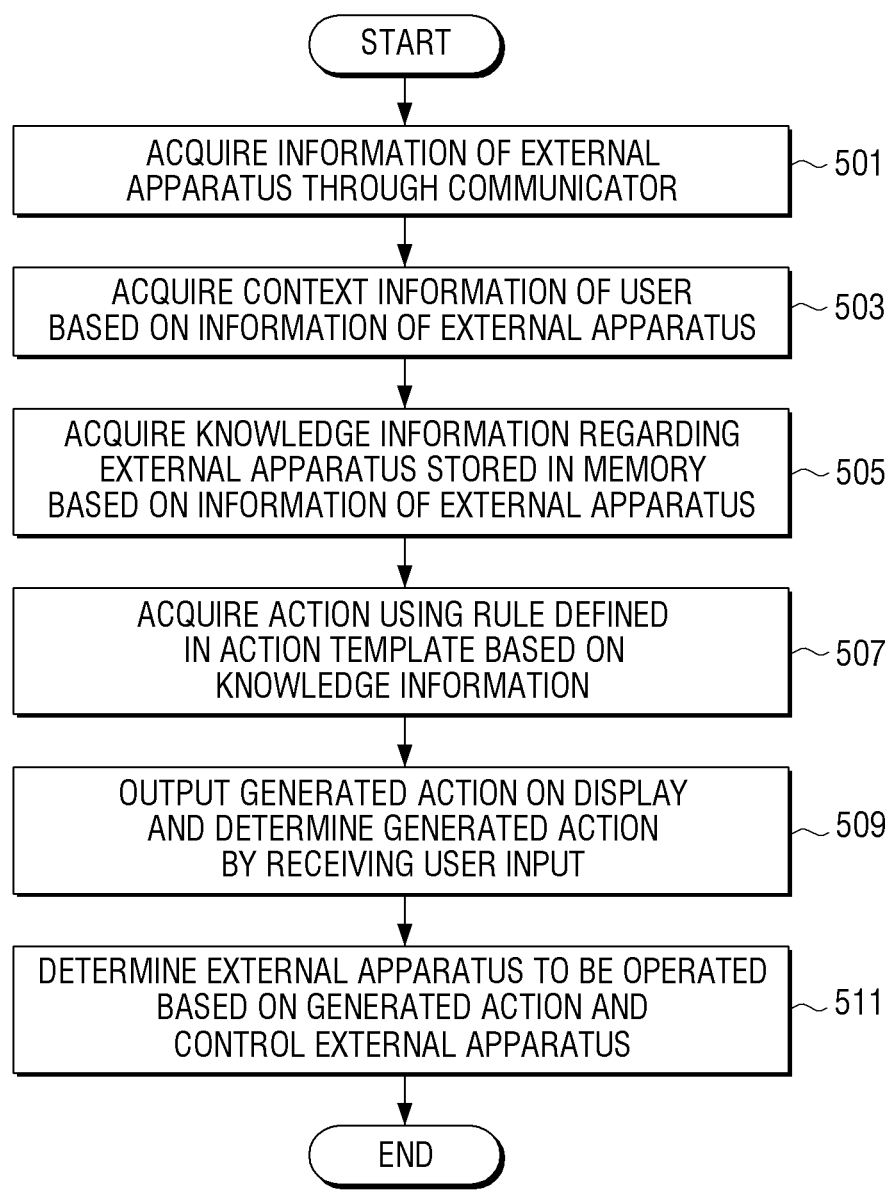

FIG. 6

| model_id | knowledge | device_type |
|---|---|---|
| samsung_aircondition_q9000 | {<br>  "power" : {<br>    "act" : "read_write",<br>    "type" : "on", "off",<br>    "value" : ["on", "off"]<br>  },<br>  "mode" : {<br>    "act" : "read_write",<br>    "type" : "enum",<br>    "value" : ["auto", "cool", "heat", "dry", "wind"]<br>  },<br>  "temperature" : {<br>    "act" : "read_write",<br>    "type" : "numeric",<br>    "high_value" : 40,<br>    "low_value" : 10<br>  },<br>  "condition" : {<br>    "act" : "read",<br>    "type" : enum",<br>    "value" : ["normal", "error"]<br>  }. | airconditioner |
| ge_link_a19 | {<br>  "power" : {<br>    "act" : "read_write",<br>    "type" : "on", "off",<br>    "value" : ["on", "off"]<br>  }.<br>  "lux" : {<br>    "act" : "read_write",<br>    "type" : "numeric",<br>    "high_value" : 255,<br>    "low_value" : 0<br>  }<br>} | light |

FIG. 7

| name | rule | condition | action |
|---|---|---|---|
| turn on light | target_type===condition_target && device===light && device===lux sensor | (time > 6oclock && time < 23oclock) && lux < 50 | $targetlight ==>turn on |
| turn on tv | target_type===condition_target && device===tv && device===motion_sensor | time === 6oclock && motion === detected | $targettv ==>turn on |
| turn on airconditioner | target_type===condition_target && device===airconditioner && device===thermostat && device===motion_sensor | motion === detected && temperature > 25 | $targetairconditioner ==>turn on |
| turn on airconditioner | target_type===execute_target && device===airconditioner | NA | $targetairconditioner ==>turn on |
| turn on airconditioner efficiently | target_type===execute_target && device===airconditionerA && device===airconditionerB | NA | get efficient aircondition && set as $targetairconditioner && $targetairconditioner ==>turn on |
| turn on airconditioner strongly | target_type===execute_target && device===airconditionerA && device===airconditionerB | NA | get strongly aircondition && set as $targetairconditioner && $targetairconditioner ==>turn on |
| turn off light | target_type===condition_target && device===light && device===lux sensor | (time > 6oclock || time < 23oclock) && lux < 30 | $targetlight ==>turn off |
| close garage door | target_type===condition_target && device===garage_door && device===motion sensor && device===openclose_sensor | garage_door === open && motion_sensor===on && openclose_sensor===close | $targetgarage_door ==> close |
| unlock door | target_type===execute_target && device===openclose sensor | NA | $targetdoor ==> open |

ELECTRONIC APPARATUS AND EXTERNAL APPARATUS CONTROLLING METHOD THEREOF

CROSS-REFERENCE TO RELATED APPLICATION

This application is based on and claims priority under 35 U.S.C. § 119 to Korean Patent Application No. 10-2016-0043447, filed in the Korean Intellectual Property Office on Apr. 8, 2016, the disclosure of which is incorporated by reference herein in its entirety.

BACKGROUND

1. Field

The present disclosure relates generally to an electronic apparatus and an external apparatus controlling method thereof, and for example, to an electronic apparatus that controls an external apparatus using external apparatus information and content information of a user and an external apparatus controlling method thereof.

2. Description of Related Art

Recently, thanks to development of semiconductor technology and wireless communication technology, subjects can be conveniently controlled via a network because various subjects include a communication function. Connecting external apparatuses via the network by subjects including a communication function is called "Internet of Things (IoT)" and use of the IoT is increasing.

An external apparatus operated in an environment of the IoT is called an IoT apparatus. In order to efficiently control such an external apparatus, a user should know functions and features of each external apparatus well. Studies to identify and efficiently control various external apparatuses in the IoT environment are being carried out. Specifically, a service, operating an external apparatus by analyzing history about how a user used an external apparatus, is provided.

With the method of operating an external apparatus by analyzing history about how a user used the external apparatus, it is difficult to derive accuracy and/or features of the external apparatus and it is inconvenient to use the method because the external apparatus can be operated only when records of the external apparatus use are accumulated to a certain extent. In addition, it is difficult to efficiently control external apparatuses because relations of a plurality of external apparatuses are not considered in IoT environments, which are rapidly increasing.

SUMMARY

An electronic apparatus according to an example embodiment of the present disclosure analyzes an operation condition and a feature using knowledge information stored in a memory about external apparatuses placed in a home and determines an external apparatus to operate by considering relations of the external apparatuses. Therefore, the electronic apparatus may control the most appropriate external apparatus to be operated in the current condition even though records of the external apparatuses use are not accumulated.

An example aspect of the present disclosure is to determine and operate an external apparatus based on a current condition and in consideration of context information of the user.

According to an example embodiment of the present disclosure, an electronic apparatus is provided, including: a communicator comprising communication circuitry configured to communicate with an external apparatus; a memory configured to store knowledge information including information regarding the external apparatus and a plurality of action templates that define an operation of the external apparatus; and a controller configured to receive identification information of the external apparatus through the communication circuitry of the communicator, to acquire the knowledge information and an action template corresponding to the external apparatus based on the identification information received from the memory, and to generate a command to operate the external apparatus based on the knowledge information and the action template and to transmit the command to the external apparatus through the communication circuitry of the communicator.

According to an example embodiment of the present disclosure, a method of controlling an external apparatus of an electronic apparatus is provided, including: receiving identification information of an external apparatus from the external apparatus through communication circuitry of a communicator; acquiring first information corresponding to the external apparatus based on the identification information from a memory; selecting at least one action template among a plurality of action templates stored in the memory based on the first information; and transmitting a command to operate the external apparatus included in the selected action template to the external apparatus.

The electronic apparatus according to an example embodiment has many advantages. Among the advantages is that an external apparatus most appropriate in a condition of a current user is selected and operated even though records of the external apparatus use are not accumulated. This is made possible because the electronic apparatus collects information on various external apparatuses using knowledge information stored in a memory and an action template, analyzes an operating condition and functions of external apparatuses, determines an external apparatus to perform a function considering relations of respective external apparatuses and operates the external apparatus.

BRIEF DESCRIPTION OF THE DRAWINGS

The above and other aspects, features and attendant advantages of the present disclosure will become more readily appreciated and understood from the following detailed description, taken in conjunction with the accompanying drawings, in which like reference numerals refer to like elements, and wherein:

FIG. 5 is a flowchart illustrating an example method of operation of an electronic apparatus according to an example embodiment;

FIG. 6 is a diagram illustrating an example of knowledge information;

FIG. 7 is a diagram illustrating an example of an action template; and

DETAILED DESCRIPTION

Figure 1:
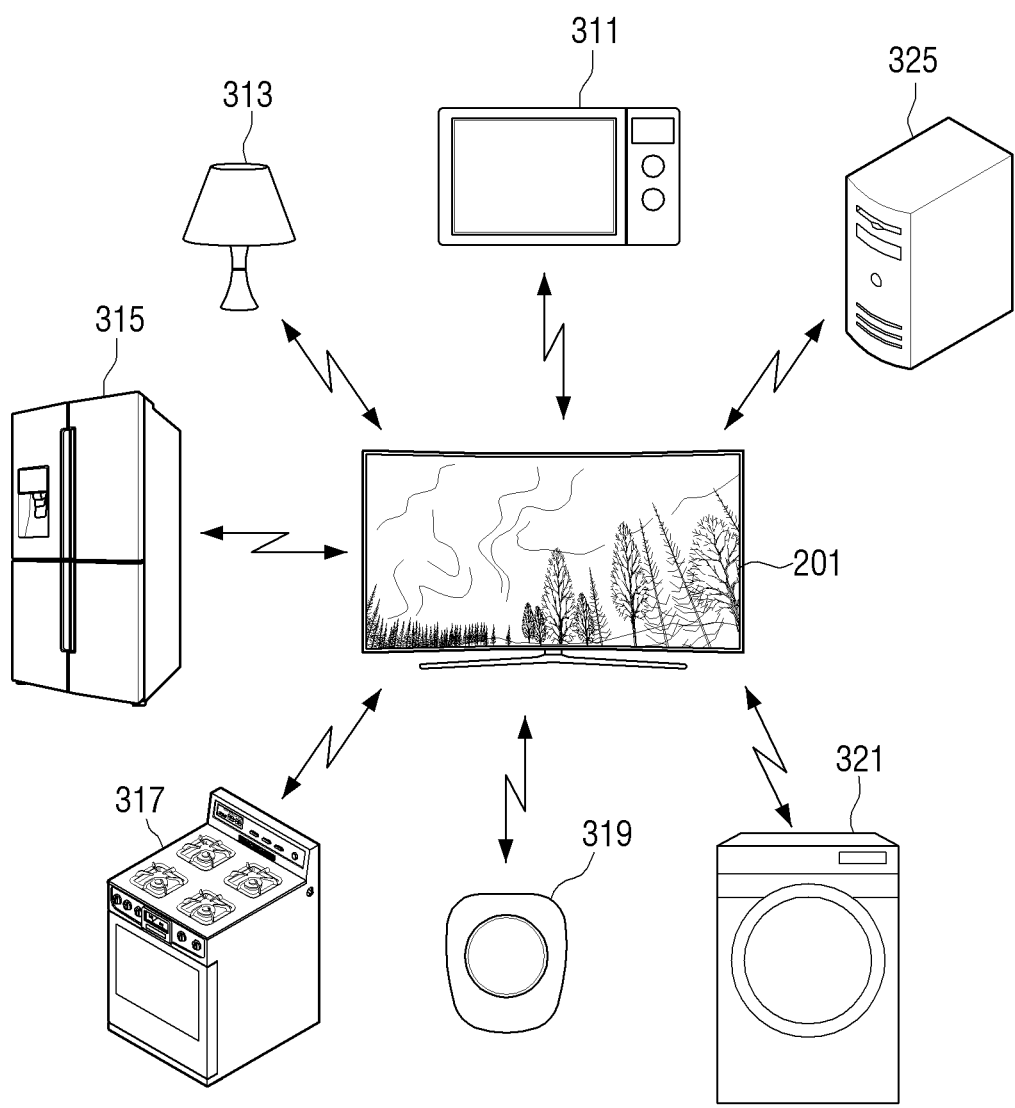
FIG. 1 is a diagram illustrating an example system configuration of an electronic apparatus and external apparatuses according to an example embodiment.

The various example embodiments are described with reference to the attached drawings. It should be understood that the disclosure is not limited to the example embodiments described hereinafter, but includes various modifications, equivalents, and/or alternatives of the examples of the disclosure. In relation to explanation of the drawings, similar drawing reference numerals may be used for similar elements.

In the disclosure, expression such as "have," "may have," "comprise" or "may comprise" indicates an existence of a related characteristic (for example, a figure, a function, an operation, an element of a component or the like) and it does not exclude an existence of additional characteristic.

When a certain element (e.g., first element) and another element (e.g., second element) are described as being "operatively or communicatively) coupled with/to" each other, or "connected to" each other, this should be understood as meaning that the certain element and another element are directly coupled or coupled via yet another element (e.g., third element).

The expression "configured to" as used herein may be used interchangeably with, depending on occasions, with, for example, "suitable for", "having the capacity to", "designed to", "adapted to", "made to" or "capable of" and used. The term "configured to" does not necessarily refer to an example of being hardware-wise "specifically designed to". Instead, in any circumstances, the expression "configured to" may refer to a device "may be able to" perform with another devices or components. For example, in a phrase "a process configured to perform A, B, and C", the "processor" may refer to a dedicated processor (e.g., embedded process) provided to perform a corresponding operation, or a generic-purpose processor capable of performing corresponding operations by implementing one or more software programs stored on a memory device (e.g., CPU or application processor).

In embodiments of the present disclosure, a "module" or a "unit" performs at least one function or operation, and may be implemented in hardware, software, or a combination of hardware and software. In addition, a plurality of 'modules' or a plurality of 'units' may be integrated into at least one module and may be implemented in at least one processor (not illustrated), except for a 'module' or a 'unit' in which they need to be implemented in specific hardware.

The terminology used herein is used only to describe a specific or various example embodiments, and may not be intended to limit a scope of another example embodiment. The terminology used herein may have a meaning that is same as that generally understood by those skilled in the art of the technical fields described herein. The terms used herein, unless otherwise specified herein, are not interpreted to be ideal or excessively formal meaning. Depending on occasions, even if a term is defined herein it should not be interpreted as foreclosing the example embodiments of the disclosure.

According to various example embodiments of the disclosure, an electronic apparatus may be, for example, a smartphone, a TV, a home appliance or an audio device, or the like, but is not limited thereto. However, an electronic apparatus according to an example embodiment is not limited to the described apparatuses and may be a new electronic apparatus according to technology development.

Hereinafter, an electronic apparatus according to various example embodiments is described with reference to the accompanying drawings. In the disclosure, a term "user" may indicate a user who uses an electronic apparatus or an apparatus that uses an electronic apparatus (for example, an artificial intelligence (AI) electronic apparatus).

FIG. 1 is a diagram illustrating an example system configuration of an electronic apparatus and external apparatuses according to an example embodiment.

FIG. 1 illustrates an electronic apparatus 201 and external apparatuses 311, 313, 315, 317, 319, 321, 325. The external apparatuses 311, 313, 315, 317, 319, 321, 325 may be IoT apparatuses. The electronic apparatus 201 may be, for example, a smart TV or a smartphone but it is not limited thereto. The electronic apparatus 201 may include a communication function and may transmit or receive data by communicating with the surrounding external apparatuses 311, 313, 315, 317, 319, 321, 325. The electronic apparatus 201 will be described in greater detail below with reference to FIGS. 3 and 4. The external apparatuses 311, 313, 315, 317, 319, 321, 325 may have a communication function and may transceiver data with the electronic apparatus 201, by communicating with the electronic apparatus 201.

The external apparatuses 311, 313, 315, 317, 319, 321, 325 may be classified into an IoT sensor 319 including a communication function that is sensing a surrounding environment and an IoT home appliance 311, 313, 315, 317, 321, 325 including a communication function.

For example, an external apparatus may be a microwave oven 311 including a communication function. The electronic apparatus 201 may receive operation hours of the microwave oven 311 and data regarding an indoor temperature and a cooking state from the microwave oven 311 and control an operation of the microwave oven 311.

The electronic apparatus may be a lighting apparatus 313 including a communication function. The electronic apparatus 201 may receive data regarding a current state and a current light level of the light apparatus 313 from the light apparatus 313 and control an operation of the light apparatus 313.

The electronic apparatus may be a refrigerator 315 including a communication function. The electronic apparatus 201 may receive data regarding a state and a temperature of the refrigerator from the refrigerator 315 and control an operation of the refrigerator 315.

The electronic apparatus 201 may communicate with the external apparatuses 311, 313, 315, 317, 319, 321 through the short range communication. The electronic apparatus 201 may receive log information from the external apparatuses 311, 313, 315, 317, 319, 321 through the short range communication. The log information may include identification information and state information of the external apparatus. The log information will be described in greater detail below with reference to FIG. 2. An example of the short range communication may be Zigbee, WiFi or Bluetooth (BT) communication.

The electronic apparatus 201 may communicate with a server 325 through the long range communication. The electronic apparatus 201 may receive information regarding an external apparatus from the server 325. For example, the electronic apparatus 201 may receive knowledge information and information regarding an action template of an external apparatus from the server 325 in real time or receive update information regarding the knowledge information and the action template.

The knowledge information may include, for example, and without limitation, a table in which a function of an external apparatus and parameters that each function of the external apparatus can have are defined in detail and may be stored in a form of database in a memory. The knowledge information will be described in greater detail below with reference to FIG. 6.

The action template may include, for example, and without limitation, a set of commands defined in a user's position and a table in which a condition to perform a command and at least one external apparatus to perform the command are defined and the action template may be stored in a form of database in a memory. The action template will be described in greater detail below with reference to FIG. 7.

For example, the telecommunication may be 3G or LTE. In addition, the electronic apparatus 201 may communicate with the server 325 on the Internet.

Figure 2:
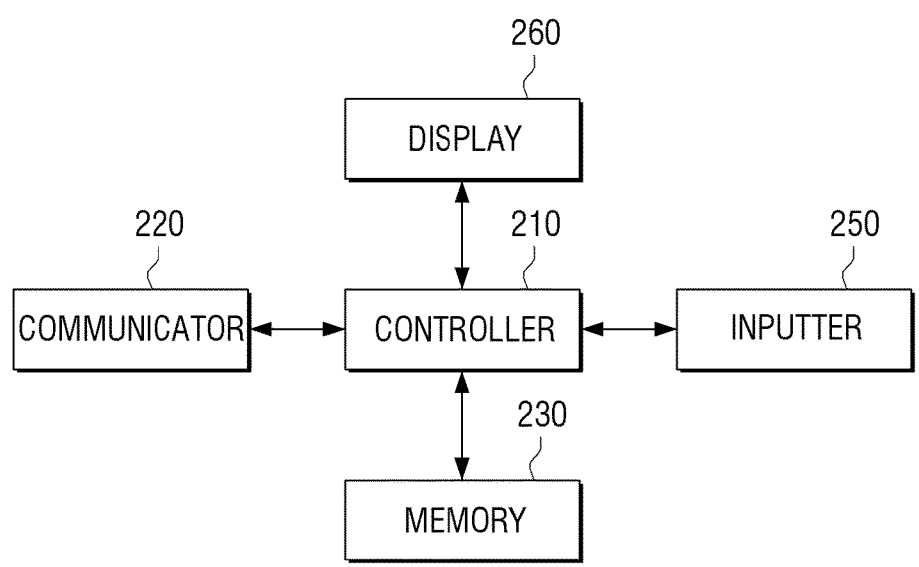
FIG. 2 is a block diagram illustrating an example electronic apparatus according to an example embodiment.

FIG. 2 is a block diagram illustrating an example electronic apparatus according to an example embodiment.

FIG. 2 illustrates a controller (e.g., including processing circuitry) 210, a communicator (e.g., including communication circuitry) 220, a memory 230, an inputter (e.g., including input circuitry) 250 and a display 260.

The communicator 220 may include various communication circuitry configured to communicate with an external apparatus and a server. The communicator 220 may communicate with an external apparatus and receive log information transmitted from the external apparatus. The log information may include identification information (ID) of the external apparatus.

The communicator 220 may include a short range communication communicator and a long range communication communicator. The electronic apparatus may communicate with an external apparatus through the short range communication communicator. The electronic apparatus 201 may communicate with the server through the long range communication communicator. Specific elements of the communicator 220 will be described in greater detail below with reference to FIG. 3.

The memory 230 may store log information received from the external apparatus. The log information may include state information of the external apparatus, external environment information that the external apparatus collected, identification information (ID: Identification Data) of the external apparatus and information regarding time in which the external apparatus collected data. For example, the external environment information may be about a current temperature and humidity around the external apparatus. If the external apparatus is a refrigerator, the log information may be a current temperature of the refrigerator and a current time. If the external apparatus is an air conditioner, the log information may be an operation state and a temperature around the air conditioner. If the external apparatus is a motion sensor, the log information may be about a time and a location where a motion is sensed. If the external apparatus is an illumination sensor, the log information may be about a surrounding illumination level.

The memory 230 may store knowledge information and an action template. The knowledge information and the action template may be received from the server and be updated periodically. The knowledge information may include detailed information on an external apparatus. The knowledge information may include, for example, and without limitation, a table in which a function of the external apparatus and a type of data and a data value that each function can have are defined in detail. The knowledge information may be stored in a form of database in a memory. The knowledge information will be described in detail with reference to FIG. 6.

The action template may include, for example, and without limitation, a table in which an operation of the external apparatus is defined. The action template is also a set of commands defined in a user's position. In the action template, a condition to perform a command and at least one external apparatus to perform the command are defined and the action template may be stored in a form of database in a memory. The action template will be described in greater detail below with reference to FIG. 7.

A sensing unit (not illustrated) may sense information regarding an environment around a user. In addition, the sensing unit may sense a movement of the user. The sensing unit may output an electronic signal corresponding to a sensed value to the controller 210. The sensing unit may be included in the electronic apparatus or may be in a separate external apparatus form. A specific operation and examples of the sensing unit will be described in detail with reference to FIG. 3.

The inputter 250 may include various circuitry configured to receive an input, e.g., a user input. For example, the inputter 250 may include various input circuitry, such as, for example, and without limitation, a keyboard, a touch or a motion input and a user may interact with the electronic apparatus through the inputter. The inputter 250 will be described in greater detail below with reference to FIG. 3.

The display 260 may display a message to a user. For example, the display 260 may display a message requesting for a check to the user and/or display a graphic object that can receive a user input. Examples of the display 260 will be described in greater detail below with reference to FIG. 3.

The controller 210 may include various processing circuitry and controls overall operation of the electronic apparatus. The controller 210 may receive log information transmitted from an external apparatus through a communicator and acquire knowledge information corresponding to the external apparatus based on the log information from a memory. Then, the controller 210 may determine an external apparatus to operate from an action template based on the knowledge information and operate the external apparatus according to an action included in the action template.

The controller 210 may determine an external apparatus to operate from the action template based on at least one of environment information around the electronic apparatus 201 and movement information of a user and control the external apparatus to perform an operation defined in the action template. The environment information may be acquired based on log information. In other words, the log information is acquired from the external apparatus and the external apparatus may collect environment information around the electronic apparatus. For example, the external apparatus may sense humidity or a temperature around the electronic apparatus and transmit the information about sensing to the electronic apparatus and the electronic apparatus may check humidity or a temperature around the electronic apparatus by analyzing data received from the external apparatus.

Figure 3:
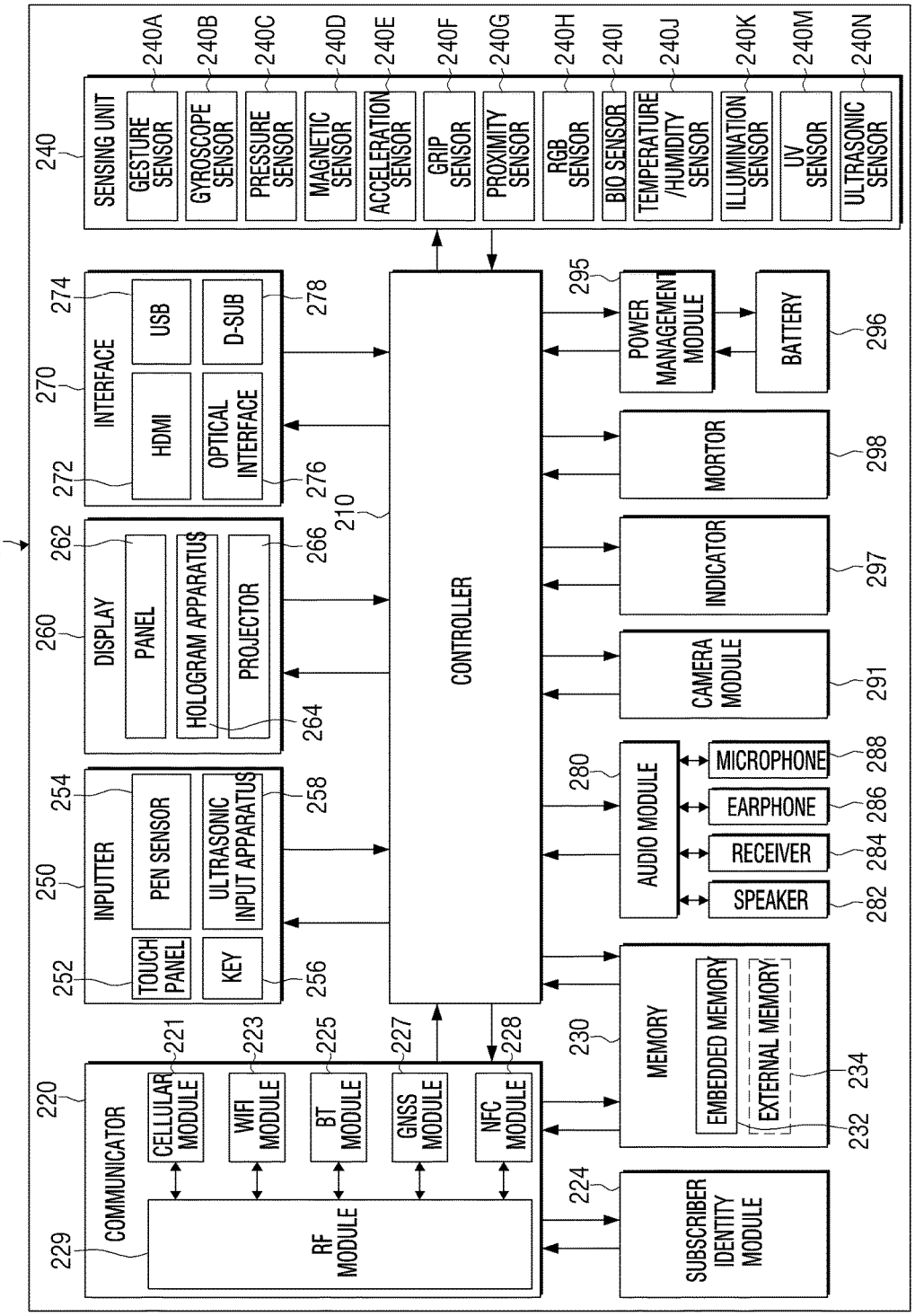
FIG. 3 is a block diagram illustrating an example electronic apparatus according to an example embodiment.

FIG. 3 is a block diagram illustrating an example electronic apparatus according to an example embodiment.

The electronic apparatus 201 may include the controller (e.g., including processing circuitry) 210, the communicator (e.g., including communication circuitry) 220, a subscriber identity module 224, the memory 230, a sensing unit 240, the inputter (e.g., including input circuitry) 250, the display 260, an interface (e.g., including interface circuitry) 270, an audio module 280, a camera module 291, a power management module 295, a battery 296, an indicator 297 and a motor 298.

For example, the controller 210 may include various processing circuitry configured to control a plurality of hardware elements or software elements that are connected to the controller 210 by driving an operating system or an application program and may process various data and perform calculations. The controller 210, for example, may be realized as a system on chip (SoC). According to an example embodiment, the controller 210 may further include a graphic processing unit (GPU) and/or an image signal processor. The controller 210 may include at least one (for example, a cellular module 221) of the elements illustrated in FIG. 3. The controller 210 may load a command or the data received from at least one of other elements (for example, a non-volatile memory) in a volatile memory and process the command or the data and store various data in the non-volatile memory.

The communicator 220 may have a configuration which is the same as or similar to the communicator 170 in FIG. 2. For example, the communicator 220 may include various communication circuitry, such as, for example, and without limitation, the cellular module 221, a WiFi module 223, a BT module 225, a GNSS module 227 (for example, a GPS module, a Glonass module, a Beidou module or a Galileo module), an NFC module 228 and a radio frequency (RF) module 229.

The cellular module 221, for example, may provide a voice call, a video call, a text message service, or an Internet service via a communication network. According to an example embodiment, the cellular module 221 may identify or authenticate the electronic apparatus 201 in the communication network by using a subscriber identity module 224 (for example, a SIM card). According to an example embodiment, the cellular module 221 may perform at least a function among functions that can be provided by the controller 210. According to an example embodiment, the cellular module 221 may include a communication processor (CP).

Each of the WiFi module 223, the BT module 225, the GNSS module 227 and the NFC module 228, for example, may include a processor to process data that is transmitted/received through a corresponding module. According to an example embodiment, some of the cellular module 221, the WiFi module 223, the BT module 225, the GNSS module 227 and the NFC module 228 (for example, two or more than two of these) may be included in an integrated chip (IC) or in an IC package.

The RF module 229, for example, may transcieve a communication signal (for example, an RF signal). The RF module 229, for example, may include a transceiver, a power amp module (PAM), a frequency filter, a low noise amplifier (LNA), an antenna or the like. According to another example embodiment, at least one of the cellular module 221, the WiFi module 223, the BT module 225, the GNSS module 227 and the NFC module 228 may transcieve an RF signal through a separate RF module.

The memory 230 (for example, a memory 130), for example, may include an embedded memory 232 and/or an external memory 234. The embedded memory 232, for example, may include at least one of a volatile memory (for example, a dynamic RAM (DRAM) memory, a static RAM (SRAM) and a synchronous dynamic RAM (SDRAM)) and a non-volatile memory (for example, a one-time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash, a NOR flash, etc.), a hard drive, a solid state drive (SSD)).

The external memory 234, for example, may further include a compact flash (CF), a secure digital (SD), a micro secure digital (Micro-SD), a mini secure digital (Mini-SD), an extreme digital (xD), a multi-media card (MMC), a memory stick or the like. The external memory 234 may be functionally and/or physically connected to the electronic apparatus 201 through various interfaces.

The sensing unit 240, for example, may measure physical quantity or detect an operation state of the electronic apparatus 201 and convert the measured or detected information into an electronic signal. For example, the sensing unit 240 may include at least one of the sensors illustrated in FIG. 3 but it is not limited thereto. The sensing unit 240 may further include a control circuit to control at least one sensor therein. The example illustrated sensing unit 240 comprises, for example, a gesture sensor 240A, a gyroscope sensor 240B, a pressure sensor 240C, a magnetic sensor 240D, a acceleration sensor 240E, a grip sensor 240F, a proximity sensor 240G, a RGB sensor 240H, a BIO sensor 240I, a temperature/humidity sensor 240J, an illumination sensor 240K, a UV sensor 240M, a ultrasonic sensor 240N. According to an example embodiment, the electronic apparatus 201 may further include a processor configured to control the sensing unit 240 in addition to or separately from the controller 210 so as to control the sensing unit 240 while the controller 210 is in a sleep state.

The inputter 250, for example, may include various input circuitry, such as, for example, and without limitation, a touch panel 252, a (digital) pen sensor 254, a key 256 or an ultrasonic input apparatus 258.

The display 260 (for example, a display (160)) may further include a panel 262, a hologram apparatus 264, a projector 266 and a control circuit to control include a panel 262, a hologram apparatus 264, or a projector 266.

The interface 270, for example, may include various interface circuitry, such as, for example, and without limitation, a high-definition multimedia interface (HDMI) 272, a universal serial bus (USB) 274, an optical interface 276, or a D-subminiature (D-sub) 278. Additionally or alternatively, the interface 270, for example, may include a mobile high-definition link (MHL) interface, a secure digital (SD) card/multi-media card (MMC) interface, or an Infrared data association (IrDA) standard interface.

The audio module 280, for example, may convert sound and an electrical signal in bilateral directions. The audio module 280, for example, may process sound information inputted or outputted through a speaker 282, a receiver 284, an earphone 286, a microphone 288 or the like.

The camera module 291, for example, is an apparatus that can shoot a still image and a video and according to an example embodiment, the camera module 291 may include at least one image sensor (for example, a front sensor or a rear sensor), a lens, an image signal controller (ISP) or a flash (for example, an LED or a xenon lamp).

The power management module 295, for example, may manage the power of the electronic apparatus 201. According to an example embodiment, the power management module 295 may include a power management integrated circuit (PMIC), a charge integrated circuit (charger IC), or a battery or fuel gauge. The PMIC may have a wired and/or wireless recharging method. The wireless recharging method, for example, may include a magnetic resonance method, a magnetic induction method, an electromagnetic wave method or the like.

The indicator 297 may display a certain state of the electronic apparatus 201 or a part (for example, the controller 210) of the electronic apparatus 201, for example, a booting state, a message state or a recharging state. The motor 298 may convert an electronic signal to a mechanical vibration and generate a vibration effect or a haptic effect. Even though it is not illustrated, the electronic apparatus 201 may include a processing unit (for example, a GPU) for supporting a mobile TV. The controller for supporting a mobile TV, for example, may process media data according to standards such as digital multimedia broadcasting (DMB) standards, digital video broadcasting (DVB) standards, mediaFlo™ standards, etc.

Each element described in the disclosure may include one or more than one component, and the name of the components may vary depending on a type of the electronic apparatus. In various example embodiments, the electronic apparatus may include at least one of elements that are described in the disclosure, and some of the elements may be omitted or other elements may be added.

Figure 4:
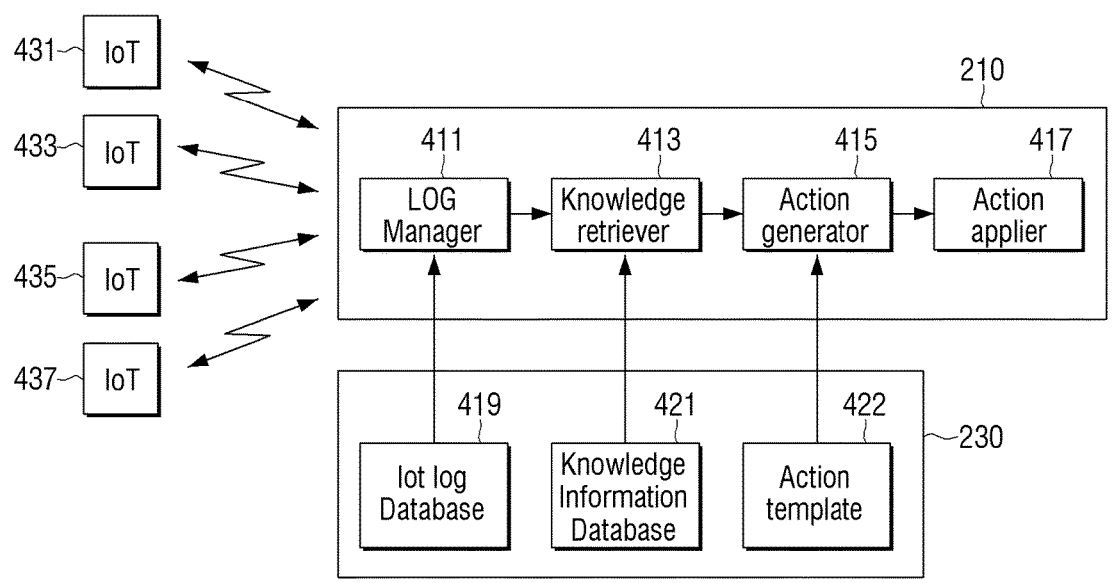
FIG. 4 is a software block diagram illustrating an example electronic apparatus according to an example embodiment.

FIG. 4 is a diagram illustrating an example software block diagram of an example electronic apparatus according to an example embodiment.

FIG. 4 illustrates external apparatuses 431, 433, 435, 437, the controller 210 and the memory 230. Software (e.g., program) modules 411, 413, 415, 417 may be generated in the controller 210. IoT log database 419, knowledge database 421 and an action template 422 may be stored in the memory. The IoT log database 419 may include log information. The knowledge database 421 may include knowledge information regarding a product.

The software modules 411, 413, 415, 417 may comprise an application, be stored in a form of instruction code in the memory 230 and, when the application is executed, a corresponding function may be performed by the data in the memory 230 being loaded in the controller 210.

The external apparatus may be an IoT electronic apparatus 431, 433 including a communication function or an IoT sensor 435, 437 that is a normal object having a sensing function and a communication function. The external apparatus may transmit ID information (identification information) of a device and log data including a sensing value and state information.

When a program is executed, the application may be loaded from the memory and perform a function. The application may include four software modules and database. The software modules may include a log manager 411, a knowledge retriever 413, an action generator 415 and an action applier 417.

The log manager 411 may receive data received from the external apparatuses 431, 433, 435, 437 in real time and store the data in the IoT log database 419. The data may be used in identifying an external apparatus placed in a home. In other words, the data received from the external apparatus may include identification information regarding the external apparatus.

The electronic apparatus may determine what external apparatus is in a home by analyzing the data. If a user executes an application, the electronic apparatus may acquire information regarding an external apparatus placed in the home through the log manager 411, from the external apparatus.

The knowledge retriever 413 may retrieve knowledge information corresponding to a certain external apparatus from the knowledge information database 421 based on the data received through the log manager 411, which is the identification information. In other words, the knowledge retriever 413 may retrieve knowledge information corresponding to the identification information of a certain external apparatus that is received through the log manager 411. The knowledge information database 421 may include detailed information regarding the external apparatus. The knowledge information database 421 may be stored in the memory 230. The knowledge information database 421 may be generated when the electronic apparatus is manufactured and updated when the electronic apparatus is connected with a server via a network. In other words, even though the electronic apparatus is not connected with the server, the electronic apparatus may acquire knowledge information corresponding to the external apparatus by using the knowledge information database 421 stored in the memory 230. The knowledge information database 421 will be described in greater detail below with reference to FIG. 6.

The action generator 415 may select at least one action template corresponding to knowledge information in a plurality of action templates 422 based on the knowledge information received from the knowledge retriever 413 and retrieve an action defined in an action template. The action template will be described in greater detail below with reference to FIG. 7. Herein, the term "action" may refer, for example, to an operation or a function that the external apparatus performs. Once the action is retrieved, the electronic apparatus may determine an external apparatus to perform the action and transmit a command regarding the action to the external apparatus through the action applier 417.

According to an example embodiment, the electronic apparatus may request for a user check for information regarding the generated action by outputting the information on a display. In other words, the electronic apparatus may display a message asking whether to perform an action or not on the display and receive a user input and transmit a command related to the action to a corresponding IoT device.

FIG. 5 is a flowchart illustrating an example method of operating an electronic apparatus according to an example embodiment.

In operation 501, the electronic apparatus may acquire information regarding an external apparatus through a communicator. The information regarding the external apparatus, for example, may include identification information regarding the external apparatus and state information of the external apparatus.

In operation 503, the electronic apparatus may acquire user context information based on the information regarding the external apparatus. The user context information, for example, may include a user behavior pattern and records on external apparatus use of the user. The sensing unit may be included in the electronic apparatus or placed outside of the electronic apparatus as an external apparatus. For example, a motion detecting sensor may be placed in a main place in a home and detect whether a user is present or not. If a plurality of motion detecting sensors are placed in the home, the electronic apparatus may receive a signal outputted from each motion detecting sensor, analyze the signal and trace a moving path of the user in the home. In addition, the electronic apparatus may acquire context information of the user by analyzing information of the external apparatus and identifying a pattern in which the user operates the external apparatus.

In operation 505, the electronic apparatus may acquire knowledge information regarding the external apparatus included in the memory based on the external apparatus information. The knowledge information may include detailed information regarding the external apparatus.

Knowledge information regarding the plurality of external apparatuses may be included in the knowledge information database and the electronic apparatus may acquire knowledge information regarding the external apparatus that is placed in the home or the user possesses by using the identification information (ID) of the external apparatus. The knowledge information regarding the external apparatus may be stored in a memory when the product is manufactured or received from a server and may be updated periodically. The knowledge information regarding the external apparatus may be provided by a manufacturer that manufactures the external apparatus or a user may directly generate the knowledge information. The electronic apparatus may display a user interface (UI) by which the knowledge information regarding the external apparatus may be edited or generated.

In operation 507, the electronic apparatus may acquire an action that can cause the external apparatus to be operated using a rule defined in an action template based on the knowledge information. For example, the electronic apparatus may determine an external apparatus to perform the action in a rule field of the action template by using the knowledge information. The action template may include information that defines an operation of the external apparatus. Specifically, the action template may include a name of an external apparatus to be operated, a condition for operating the external apparatus and a command to perform an operation in response to the condition being satisfied.

According to an example embodiment, a controller of the electronic apparatus may select at least one action template among the plurality of action templates based on at least one of environment information and user movement information, and control the communicator to transmit a command to perform an operation defined in the selected action template to the external apparatus.

In operation 509, the electronic apparatus may output the generated action on a display, receive an input from a user and determine the generated action. In response to the action being generated, the electronic apparatus may output information regarding the action to be performed on the display or output as an audio for requesting an input of the user and in response to an input being received from the user, the electronic apparatus may transmit a command corresponding to the external apparatus to perform the action.

For example, if an action to be performed is to maintain the temperature and humidity of a home as 22° and 5% respectively, the electronic apparatus may display a desired temperature as 22° and desired humidity as 5% on the display and display a message requesting for a check to a user or display a corresponding graphic object. When the user touches the message or the graphic object, the electronic apparatus may transmit a command to maintain a temperature as 22° to an air conditioner and a command to maintain humidity as 5% to a dehumidifier.

In operation 511, the electronic apparatus may determine an external apparatus to perform an action by referring to the selected action template and transmit a command to control the external apparatus. The external apparatus to perform the action may be included in a rule field of the action template and the electronic apparatus may determine the external apparatus to perform the action by referring to the rule field.

According to an example embodiment, the electronic apparatus may select an external apparatus which is the most efficient among a plurality of external apparatuses that have similar functions and operate the external apparatus. For example, if a user inputs a command to operate a dehumidifying function, the electronic apparatus may determine the air conditioner and the dehumidifier as external apparatuses which have the dehumidifying function. In response to receiving a command to dehumidify from a user, the electronic apparatus may select a dehumidifier of which power consumption is low and that is dehumidification-efficient, and then the electronic apparatus may operate the dehumidifier. While the dehumidifier performing the dehumidifying operation, if humidity around the dehumidifier decreases but humidity around the air conditioner placed near the dehumidifier does not decrease, the electronic apparatus may output a message suggesting the user to find a factor of increasing humidity near the air conditioner.

According to another example embodiment, if a user inputs a command to dehumidify in a condition that the user feels hot, the electronic apparatus may determine that the user feels hot by context information of the user, and perform a dehumidifying operation and lower a temperature at the same time, by operating the air conditioner in response to the command to dehumidify from the user.

According to an example embodiment, if it is determined that a user stopped the external apparatus operated based on an action defined in the action template, the electronic apparatus may stop a re-operation of the external apparatus. For example, while the dehumidifier is operated according to an action defined in an action template, if the user repetitively stops the dehumidifier operation, the electronic apparatus may determine that the user has stopped the dehumidifier intentionally and the electronic apparatus may stop a re-operation of the dehumidifier. In addition, the electronic apparatus may amend the action template to stop the dehumidifier's operation.

FIG. 6 is a diagram illustrating an example of knowledge information according to an example embodiment.

Referring to FIG. 6, the knowledge information may include information regarding a plurality of external apparatuses. The knowledge information may include a function of an external apparatus and a data type and a data value that each function can have.

The knowledge information may include an ID field 601, a knowledge field 602 and a device type field 603.

The ID field 601 may include information regarding a name of a product for user identification, a model name and a manufacturer name. For example, if an external apparatus is an air conditioner, the ID field 611 may be generated by combining the manufacturer name "Samsung," the product name "Aircondition" and model name "q9000."

The knowledge field 602 may include a function of a product, a data type and a data value that each function can have. For example, an air conditioner may include a power 612, a mode 614, a temperature 616 and a condition 618. Each of the elements 612, 614, 616, 618 may have a corresponding data value. The power 612 may have ["on", "off"] 613 as a data value. The mode 614 may have ["auto", "cool", "heat", "dry", "wind"] 615 as a data value. The temperature 616 may have "40" as the highest value and "10" as the lowest value 617. The condition 618 may have ["normal", "error"] 619 as a data value. The device field 603 may be "airconditioner" 620.

If the external apparatus is a smart light bulb, the ID field 631 is "ge_link_a19" and the ID field 631 can be generated by combining the manufacturer name "ge," the product name "link" and the model name "a19." The smart light bulb may include "power" 632 and "lux" 634 as elements regarding a function field. The "power" 632 may have ["on", "off"] 633 as a data value. The "lux" 634 may have "high value":255, "low value":0 635 as a data value. The device type field 603 may be "light" 636.

FIG. 7 is a diagram illustrating an example of an action template according to an example embodiment.

FIG. 7 illustrates that the action template includes a name field 701, a rule field 703, a condition field 705 and an action field 707. The name field 701 may play a role as a call sign regarding an action. In other words, the action name of an action may be a call signal for selection of a wanted action among a plurality of actions defined in the action template. The rule field 703 defines a rule for selection of at least one action among the plurality of actions. The rule field 703 may include a name of at least one external apparatus that becomes an object to perform the action and/or information regarding a condition of the selection. If a condition for selecting the action is included in the rule field 703, the electronic apparatus may refer to the condition field 705. In other words, the rule field 703 may refer to the condition field 705.

The condition field 705 may include a condition to operate the external apparatus. The action field 707 may include an external apparatus to perform an action and the action to be performed by the external apparatus. The electronic apparatus, in response to the condition of the condition field 705 being satisfied, may select at least one external apparatus to perform an action by referring to the action field 707 and control the external apparatus to perform the action.

For example, the name field 701 may be filled with "turn on light" 711, the rule field 703 may be filled with "target_type==condition_target && device==light && device==lux sensor," the condition field 705 may be filled with "(time>6 oclock && time<23 oclock) && lux<50" 715 and the action field 707 may be filled with "$targetlight=>turn on" 717. Since the rule field 703 includes a condition, the electronic apparatus may refer to the condition field 705 to determine a condition.

Figure 8:
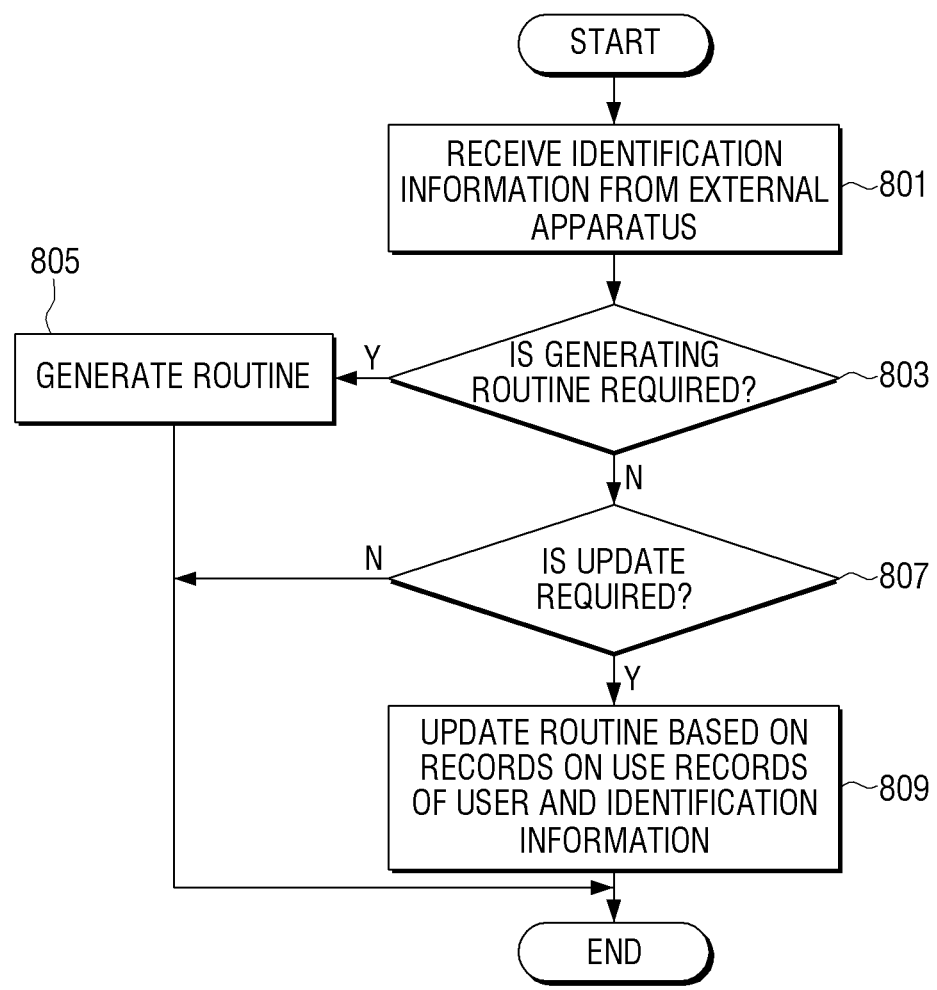
FIG. 8 is a flowchart illustrating an example method of generating a routine in an electronic apparatus according to an example embodiment.

FIG. 8 is a flowchart illustrating an example method of generating a routine in an electronic apparatus according to an example embodiment.

Referring to FIG. 8, the electronic apparatus receives identification information of an external apparatus from the external apparatus in operation 801. Detailed explanations on the identification information are the same as the above descriptions and thus, detailed explanations are omitted.

The electronic apparatus may group a plurality of external apparatuses as one based on the received identification information and collectively control the grouped plurality of external apparatuses. In addition, if there are a plurality of external apparatuses operated in a certain period of time based on the identification information received from the external apparatus, the electronic apparatus may make the plurality of external apparatuses as a group.

For example, the electronic apparatus may determine whether there are patterns of regular use when a user uses the external apparatus and, in response to there being patterns of regular use, the electronic apparatus may generate a routine by grouping the patterns. The routine may include information regarding an external apparatus's set value that user sets and information regarding an order of operating external apparatuses. For example, if the user turns on a light in a bedroom at 6 o'clock in the morning, turns on a TV in five minutes and sets and operates an air conditioner to 26 Celsius degrees, the electronic apparatus may receive identification information from the light, the TV and the air conditioner which are external apparatuses. Herein, information may be received in the order of "the light→the TV→the air conditioner" and the electronic apparatus may determine that there are certain patterns in the received identification information and make a group. In other words, the electronic apparatus analyzes the identification information received for a certain period of time and if an order of received information is identical and the information is repetitively and regularly received, the electronic apparatus may group patterns and generate a routine. The routine may include a state of a light (on/off), intensity of illumination, channel information of a TV and a desired temperature of an air conditioner. When the routine is generated, a graphic object corresponding to the generated routine may be displayed on a screen. If the user selects the graphic object displayed on the screen, functions corresponding to the routine may be collectively performed. For example, if routines are generated, the electronic apparatus may display a list of the generated routines on the screen and if the user touches one of the routines, functions regarding the selected routine may be collectively performed.

In operation 803, the electronic apparatus determines whether generating a routine related to the grouped identification information is required. If it is determined that generating a routine is required, the electronic apparatus may generate a routine in operation 803. In operation 805, the electronic apparatus may analyze identification information received for a certain period of time to generate a routine and determine an order of operating external apparatuses. If the order to operate external apparatuses is regularly repeated, the electronic apparatus may group the external apparatuses as one and generate a routine.

The electronic apparatus may automatically apply a set value regarding an external apparatus that a user frequently uses into a routine. For example, if external apparatuses included in a routine are a TV and an air conditioner, if a user frequently watches channel 7 on the TV and the user frequently sets a desired temperature of the air conditioner to 26 Celsius degrees, the electronic apparatus may automatically set a set value of the TV included in the routine as channel 7 and a desired temperature of the air conditioner included in the routine to 26 Celsius degrees.

In operation 803, if it is determined that generating a routine is not required, the electronic apparatus determines whether the routine should be updated in operation 807. If a routine is already generated, the electronic apparatus may determine that generating a routine is not required.

In operation 809, the electronic apparatus may update a routine based on a routine of use records of a user and identification information. If an external apparatus included in a routine according to a use pattern of the user or a set value regarding the external apparatus is changed, the electronic apparatus may update the routine.

According to an example embodiment, the electronic apparatus may display a message requesting for a check to the user at some point in operations 803 to 805 on a display and generate a routine by receiving a user input. In addition, after operation 807, the electronic apparatus may display a message requesting for a check to the user on the display and generate a routine by receiving an input from the user.

Further, method of controlling an external apparatus of an electronic apparatus as described above may be implemented by at least one execution program (or application) for executing the method of controlling an external apparatus of an electronic apparatus as described above and the execution program may be provided while being stored in a computer readable medium.

The non-transitory computer readable medium is a medium that stores data and/or instructions therein and is readable by a device. In detail, various applications or programs described above may be stored and provided in the computer readable medium such as a compact disk (CD), a digital versatile disk (DVD), a hard disk, a Blu-ray disk, a universal serial bus (USB), a memory card, and a read only memory (ROM).

Although the example embodiments have been disclosed for illustrative purposes with the attached drawings, the electronic apparatus is not limited thereto and those skilled in the art will appreciate that various modifications, additions and substitutions are possible, without departing from the scope and spirit of the disclosure as set forth in the accompanying claims.

Although example embodiments are provided for explanation and understanding of technical features, the present disclosure is not intended to limit the scope of the technologies thereto. Accordingly, the scope of the present disclosure should be understood to include all variations and various other example embodiments based on the technical concept of the present disclosure.

What is claimed is:

1. An electronic apparatus, comprising:
    a communicator comprising communication circuitry;
    a memory configured to store knowledge information regarding at least one function of an external apparatus and a plurality of action templates defining an operation of the external apparatus to perform the at least one function; and
    a controller configured to:
    based on receiving identification information of the external apparatus, acquire knowledge information corresponding to the external apparatus based on the identification information from the memory, the knowledge information comprising performance information regarding the at least one function,
    acquire an action template corresponding to an operation for performing the function,
    generate a command to operate the external apparatus based on the knowledge information and the action template, and
    control the communicator to transmit the command to the external apparatus,
    wherein the controller, based on a plurality of knowledge information corresponding to each of a plurality of external apparatuses being acquired, compares performance information regarding the function included in each of the plurality of knowledge information and selects any one of the plurality of external apparatuses based on a result of comparison.

2. The apparatus as claimed in claim 1, wherein the knowledge information includes one or more of function information or state information of the external apparatus.

3. The apparatus as claimed in claim 1, wherein the action template includes one or more of a name of an external apparatus to be operated, a condition for operating the external apparatus and a command to perform an operation in response to the condition being satisfied.

4. The apparatus as claimed in claim 1, wherein the controller is configured to select at least one action template from among the plurality of action templates based on at least one of: environment information and user movement information, and to control the communication circuitry of the communicator to transmit a command to perform an operation defined in the selected action template to the external apparatus.

5. The apparatus as claimed in claim 4, wherein the environment information is received from the external apparatus.

6. The apparatus as claimed in claim 1, wherein the knowledge information and the action template are updated based on data received from a server.

7. The apparatus as claimed in claim 1, wherein the controller is configured to group a plurality of external apparatuses as one based on the identification information received from the external apparatus and to collectively control the grouped plurality of external apparatuses.

8. The apparatus as claimed in claim 7, wherein the controller, in response to there being the plurality of external apparatuses that operate within a certain period of time based on the identification information received from the external apparatus, is configured to group the plurality of external apparatuses.

9. The apparatus as claimed in claim 1, wherein the controller, if it is determined that an operation of the external apparatus that operates based on an action defined in the action template is stopped by a user, is configured to stop a re-operation of the external apparatus.

10. A method of controlling an external apparatus of an electronic apparatus, comprising:
    receiving identification information of an external apparatus from the external apparatus through communication circuitry of a communicator;
    acquiring knowledge information corresponding to the external apparatus based on the identification information from a memory, the knowledge information regarding at least one function of the external apparatus comprising performance information regarding the at least one function;
    acquiring an action template corresponding to an operation for performing the function, the action template defining the operation of the external apparatus to perform the at least one function,
    generating a command to operate the external apparatus based on the knowledge information and the action template; and
    transmitting the command to the external apparatus,
    wherein the generating comprises, based on a plurality of knowledge information corresponding to each of a plurality of external apparatuses being acquired, comparing performance information regarding the function included in each of the plurality of knowledge information, and selecting any one of the plurality of external apparatuses based on a result of comparison.

11. The method as claimed in claim 10, wherein the knowledge information includes one or more of function information or state information of the external apparatus.

12. The method as claimed in claim 10, wherein the action template includes one or more of a name of an external apparatus to be operated, a condition for operating the external apparatus and a command to perform an operation in response to the condition being satisfied.

13. The method as claimed in claim 10, further comprising:
    selecting at least one action template from among the plurality of action templates based on at least one of environment information and user movement information, and transmitting a command to perform an operation defined in the selected action template to the external apparatus.

14. The method as claimed in claim 13, wherein the environment information is received from the external apparatus.

15. The method as claimed in claim 10, wherein the knowledge information and the action template are updated based on identification information received from a server.

16. The method as claimed in claim 10, further comprising:
grouping a plurality of external apparatuses as one based on the identification information received from the external apparatus; and
collectively controlling the grouped plurality of external apparatuses.

17. The method as claimed in claim 16, wherein the grouping includes, in response to there being the plurality of external apparatuses that operate within a certain period of time based on the identification information received from the external apparatus, grouping the plurality of external apparatuses.

18. The method as claimed in claim 10, further comprising:
stopping a re-operation of the external apparatus if it is determined that an operation of the external apparatus that operates based on an action defined in the action template is stopped by a user.

19. A non-transitory computer readable recording medium having including a program which, when executed by a processor, causes an electronic apparatus to perform operations comprising:
receiving identification information of an external apparatus from the external apparatus through communication circuitry of a communicator;
acquiring knowledge information corresponding to the external apparatus based on the identification information from a memory, the knowledge information regarding at least one function of the external apparatus comprising performance information regarding the at least one function;
acquiring an action template corresponding to an operation for performing the function, the action template defining the operation of the external apparatus to perform the at least one function,
generating a command to operate the external apparatus based on the knowledge information and the action template; and
transmitting the command to the external apparatus,
wherein the generating comprises, based on a plurality of knowledge information corresponding to each of a plurality of external apparatuses being acquired, comparing performance information regarding the function included in each of the plurality of knowledge information, and selecting any one of the plurality of external apparatuses based on a result of comparison.

* * * * *